United States Patent
Ooi

(10) Patent No.: US 9,116,694 B2
(45) Date of Patent: Aug. 25, 2015

(54) EFFICIENT LOW POWER EXIT SEQUENCE FOR PERIPHERAL DEVICES

(71) Applicant: Intel Corporation, Santa Clara, CA (US)

(72) Inventor: Eng Hun Ooi, Georgetown (MY)

(73) Assignee: Intel Corporation, Santa Clara, CA (US)

( * ) Notice: Subject to any disclaimer, the term of this patent is extended or adjusted under 35 U.S.C. 154(b) by 357 days.

(21) Appl. No.: 13/627,779

(22) Filed: Sep. 26, 2012

(65) Prior Publication Data

US 2014/0089693 A1    Mar. 27, 2014

(51) Int. Cl.
   *G06F 1/32*   (2006.01)

(52) U.S. Cl.
   CPC .............. *G06F 1/3206* (2013.01); *G06F 1/325* (2013.01); *G06F 1/3268* (2013.01); *Y02B 60/1246* (2013.01); *Y02B 60/32* (2013.01)

(58) Field of Classification Search
   CPC ......... G06F 1/32; G06F 1/3268; G06F 1/325; G06F 1/3256
   USPC .................................................. 713/320, 323
   See application file for complete search history.

(56) References Cited

U.S. PATENT DOCUMENTS

| 6,854,045 | B2 | 2/2005 | Ooi et al. |
| 7,028,199 | B2 * | 4/2006 | Ayyavu et al. ................. 713/323 |
| 7,328,356 | B2 * | 2/2008 | Igari ............................. 713/320 |
| 7,565,457 | B2 | 7/2009 | Ooi et al. |
| 7,603,514 | B2 | 10/2009 | Ooi |
| 7,743,178 | B2 * | 6/2010 | Warren et al. ................... 710/30 |
| 7,844,777 | B2 | 11/2010 | Guok et al. |
| 7,974,304 | B2 * | 7/2011 | Xu et al. ........................ 370/459 |
| 8,051,314 | B2 | 11/2011 | Huffman et al. |
| 8,131,921 | B2 | 3/2012 | Ooi |
| 8,138,803 | B2 * | 3/2012 | Ng et al. ......................... 327/65 |
| 8,250,393 | B2 * | 8/2012 | Qin et al. ...................... 713/320 |
| 8,281,043 | B2 | 10/2012 | Edwards et al. |
| 8,316,179 | B2 | 11/2012 | Ooi |
| 8,443,221 | B2 * | 5/2013 | Kagan et al. .................. 713/323 |
| 8,464,084 | B2 * | 6/2013 | Huffman et al. .............. 713/320 |
| 8,606,992 | B2 | 12/2013 | Ooi |

(Continued)

OTHER PUBLICATIONS

International Search Report and Written Opinion mailed Jul. 18, 2012 for PCT/US2011/066188, filed Dec. 20, 2011, 9 pages.

(Continued)

*Primary Examiner* — Chun Cao
(74) *Attorney, Agent, or Firm* — Blakely, Sokoloff, Taylor & Zafman LLP

(57) ABSTRACT

Embodiments of the invention describe methods, apparatuses and systems for providing an efficient low power exit sequence for peripheral devices. In embodiments of the invention, a signal from a host device is transmitted to a SATA peripheral device for exiting a low-power state. An initialization time for OOB transmission and reception logic of the SATA peripheral device is tracked, and a reference time value based on the tracked initialization time is stored. In subsequent transitions from said low-power state, the reference time value for waking a host physical layer is utilized, thereby improving the efficiency of the management and use of said low power state. In some embodiments, the above described tracked initialization comprises a time from a transmission of an OOB signal (from the host to the peripheral device) to receiving an OOB response at the host device from the SATA peripheral device.

20 Claims, 6 Drawing Sheets

(56) References Cited

U.S. PATENT DOCUMENTS

| | | |
|---|---|---|
| 8,819,462 B2 * | 8/2014 | Cheong .................. 713/320 |
| 2003/0158991 A1 * | 8/2003 | Deyring et al. ............. 710/305 |
| 2006/0075164 A1 | 4/2006 | Ooi |
| 2006/0107032 A1 | 5/2006 | Paaske et al. |
| 2006/0271796 A1 | 11/2006 | Kaimal et al. |
| 2007/0073416 A1 | 3/2007 | Grawrock |
| 2007/0093231 A1 * | 4/2007 | Abhishek et al. ......... 455/343.4 |
| 2008/0130875 A1 | 6/2008 | Ahlquist |
| 2008/0194300 A1 | 8/2008 | Rofougaran et al. |
| 2009/0006657 A1 | 1/2009 | Azam et al. |
| 2009/0172204 A1 | 7/2009 | Igari |
| 2009/0177804 A1 | 7/2009 | Nemazie et al. |
| 2009/0177831 A1 | 7/2009 | Nemazie et al. |
| 2010/0228899 A1 | 9/2010 | Lu et al. |
| 2010/0250791 A1 * | 9/2010 | Johnson et al. ................ 710/18 |
| 2011/0099306 A1 | 4/2011 | Azam et al. |

OTHER PUBLICATIONS

Notification of Transmittal of the International Search Report and Written Opinion of the International Searching Authority, International Application No. PCT/US2013/045018, mailed Sep. 6, 2013, 10 pages.

\* cited by examiner

EFFICIENT LOW POWER EXIT SEQUENCE FOR PERIPHERAL DEVICES

FIELD

Embodiments of the invention generally pertain computing devices and more particularly to system peripheral device power management.

BACKGROUND

The increasing use of mobile computing devices drives the need for improving device power efficiency and responsiveness. The ability of mobile computing device hardware and operating systems to closely manage the power of one or more peripheral devices attached to the host platform independent from other platform components is becoming increasingly important. Said peripheral devices may utilize interconnection standards such as Peripheral Component Interconnect express (PCIe), Serial Advanced Technology Attachment (SATA), Small Computer Systems Interface (SCSI), Fibre Channel (FC), SCSI over Internet (iSCSI), Serial Attached SCSI (SAS), Universal Serial Bus (USB), or any functionally equivalent protocol for peripheral devices.

To enable aggressive power/battery life performance for mobile devices, the SATA interface utilizes the DevSleep interface power state. DevSleep enables host platforms and peripheral devices to completely shut down the SATA interface; this power state results in more power savings compared to other existing Partial and Slumber interface power states, which require that the physical layers (PHY) of the host platform and peripheral device be left powered on.

BRIEF DESCRIPTION OF THE DRAWINGS

The following description includes discussion of figures having illustrations given by way of example of implementations of embodiments of the invention. The drawings should be understood by way of example, and not by way of limitation. As used herein, references to one or more "embodiments" are to be understood as describing a particular feature, structure, or characteristic included in at least one implementation of the invention. Thus, phrases such as "in one embodiment" or "in an alternate embodiment" appearing herein describe various embodiments and implementations of the invention, and do not necessarily all refer to the same embodiment. However, they are also not necessarily mutually exclusive.

Figure 1A:
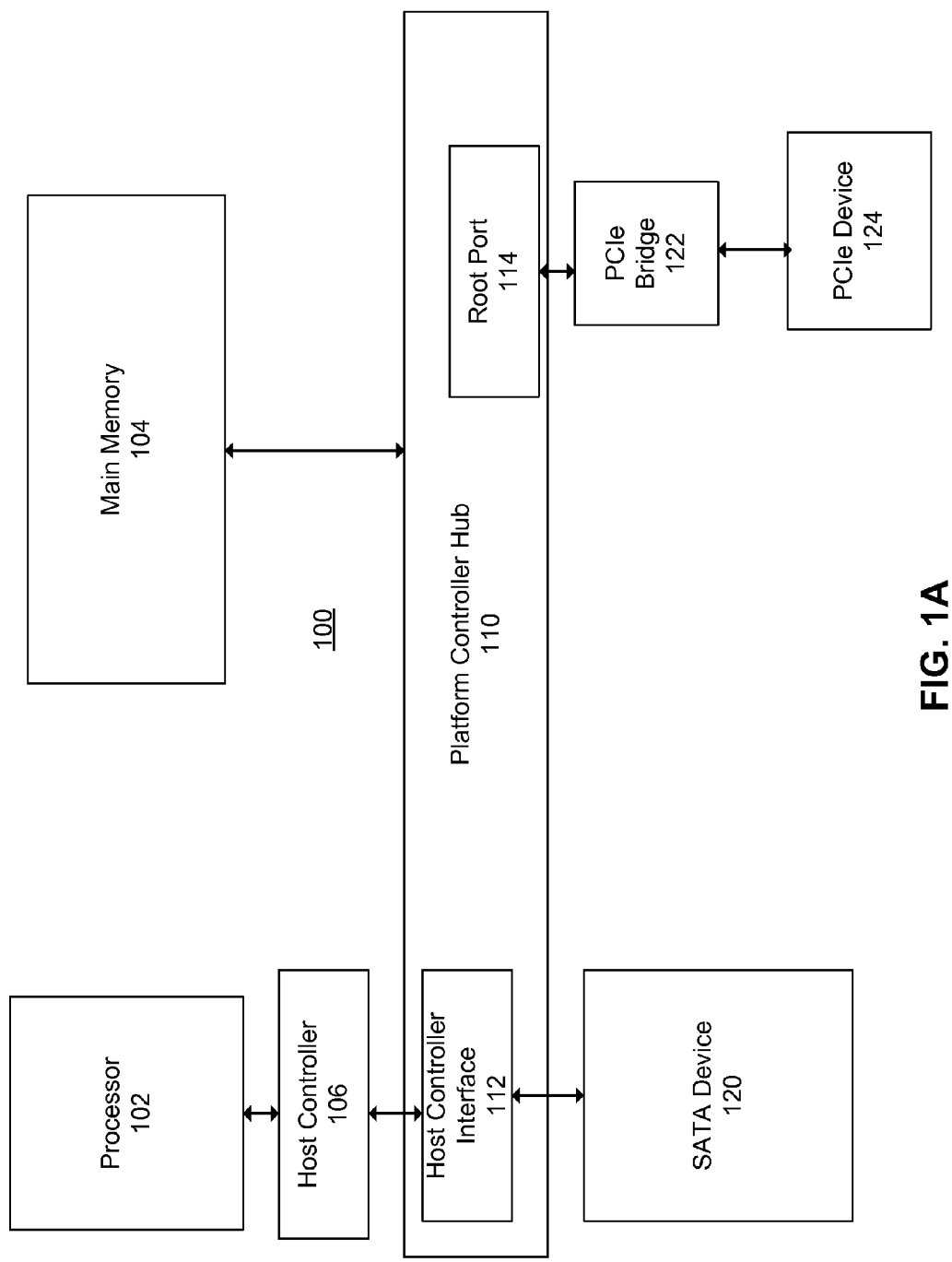
FIG. 1A and FIG. 1B are block diagrams of host platform hardware and peripheral devices to utilize an embodiment of the invention.

Descriptions of certain details and implementations follow, including a description of the figures, which may depict some or all of the embodiments described below, as well as discussing other potential embodiments or implementations of the inventive concepts presented herein. An overview of embodiments of the invention is provided below, followed by a more detailed description with reference to the drawings.

DESCRIPTION

Embodiments of the invention describe efficient management of low power states for peripheral devices. The increasing use of mobile computing devices also places an increased emphasis on the ability of the system and OS to completely power down storage devices and the storage controller during long periods of idleness. Implementing DevSleep in addition to other low power states on the host platform provides for a hierarchical power management solution that allows the system to choose between power and latency in a dynamic and efficient manner. Thus, improving the efficiency of the DevSleep interface power state increases its effectiveness and applicability compared to the other interface power states for SATA devices.

Embodiments of the invention describe methods, apparatuses and systems for transmitting a signal from a host device to a Serial Advanced Technology Attachment (SATA) peripheral device for exiting a low-power state (said SATA device, for example, consistent with the Serial ATA Specification, Revision 3.0, published Jun. 29, 2009 by the SATA International Organization). An initialization time for out-of-band (OOB) transmission and reception logic of the SATA peripheral device is tracked, and a reference time value based on the tracked initialization time for the OOB transmission and reception logic of the SATA peripheral devices is stored. In subsequent transitions from said low-power state, the reference time value for waking a host physical layer is utilizing, thereby improving the efficiency of the management and use of said low power state.

In some embodiments, the above described tracked initialization time for the OOB transmission and reception logic of the SATA peripheral device comprises a time from a transmission of an OOB signal (from the host to the peripheral device) to receiving an OOB response at the host device from the SATA peripheral device. In some of these embodiments, the above described reference time value comprises a lowest value of a plurality of tracked initialization times for the OOB transmission and reception logic; in other embodiments, said reference time value may comprise an average value of a plurality of tracked initialization times for the OOB transmission and reception logic, a weighted average, a minimum tracked value, a maximum tracked value, etc.

In the following description numerous specific details are set forth to provide a thorough understanding of the embodiments. One skilled in the relevant art will recognize, however, that the techniques described herein can be practiced without one or more of the specific details, or with other methods, components, materials, etc. In other instances, well-known structures, materials, or operations are not shown or described in detail to avoid obscuring certain aspects.

Reference throughout this specification to "one embodiment" or "an embodiment" means that a particular feature, structure, or characteristic described in connection with the embodiment is included in at least one embodiment of the present invention. Thus, the appearances of the phrases "in one embodiment" or "in an embodiment" in various places throughout this specification are not necessarily all referring to the same embodiment. Furthermore, the particular features, structures, or characteristics may be combined in any suitable manner in one or more embodiments.

FIG. 1A is a block diagram of host platform hardware and peripheral devices to utilize an embodiment of the invention. In this embodiment, host system 100 includes processor 102, main memory 104, and host controller 106 (which may be alternatively referred to herein as a Host Bus Adaptor (HBA)). Main memory 104 may include any combination of volatile and non-volatile memory, and may include an OS to be executed by processor 102.

Host controller 106 may be any controller capable of exchanging data and/or commands with a storage device in accordance with, for example, any of a Small Computer Systems Interface (SCSI) protocol, a Fibre Channel (FC) protocol, a SCSI over Internet Protocol (iSCSI), a Serial Attached SCSI (SAS) protocol, a Universal Serial Bus (USB) protocol and a SATA protocol.

If host controller 106 is to exchange data and/or commands with a memory device in accordance with a SATA protocol, the SATA protocol may comply and/or be compatible with the protocol previously described. Said SATA peripheral devices may include, but are not limited to, a hard disk storage device, a solid-state drive (SSD) storage device, an optical storage drive, hybrid storage devices (e.g., a combination hard disk/SSD storage device), etc.

Figure 1B:
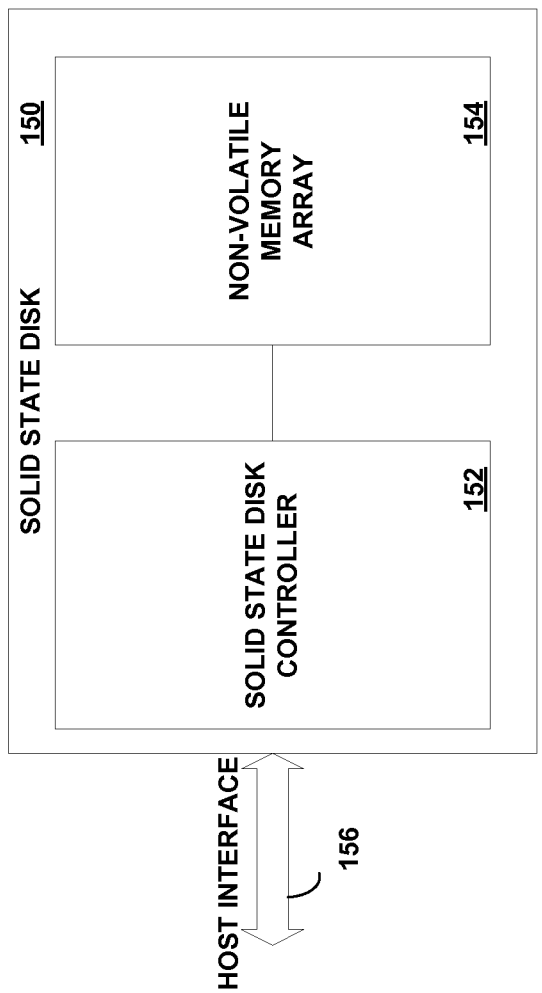

FIG. 1B is a block diagram of an embodiment of a SATA SSD storage device. SSDs (such as device 120 of FIG. 1A) use semiconductor memories, also referred to as solid state memories, as a storage medium. Semiconductor memories are comparatively more rugged than hard drives and offer the advantage of being much less sensitive to vibration, dust, humidity, and sudden changes in velocity. Semiconductor memories also tend to require less power than a typical hard drive with similar storage capacity. As discussed above, in some embodiments, a "hybrid" SATA peripheral device may include a hard disk component as well as a semiconductor memory.

Solid state disk 150 includes a solid state disk controller 152 to control nonvolatile memory array 154. Solid state disk 150 communicates with a host controller via a host interface 156 (e.g., based on a SATA protocol as discussed above). The solid state disk controller 152 controls reading, writing and erasing of the nonvolatile memory array 154, as well as execute processes involving host controller 106 as described below.

Of course, alternatively or additionally, host controller 106 may exchange data and/or commands with an SSD via one or more other and/or additional protocols without departing from this embodiment.

Platform Controller Hub (PCH) 110 may include modules or logic to manage the interconnections between the above described components of host system 100 and various peripheral devices.

In this embodiment, SATA device 120 is shown to be coupled to processor 102 and main memory 104 via host controller interface (i.e., SATA interface) 112. Peripheral Component Interconnect express (PCIe) (as described, for example, in The PCI Express Base Specification of the PCI Special Interest Group, Revision 3.0 published Nov. 18, 2010) device 124 is shown to be coupled to PCIe bridge 122, which is coupled to root port 114. It is understood that PCIe bridge 122 acts as a "switch" for one or more PCIe devices, while root port 114 acts as an interconnect to processor 102 and main memory 104.

Communication between PCH 110 and SATA device 120 may be based on the ATA/ATAPI Command Set (based on the INCITS 452-2008 (D1699): AT Attachment 8-ATA/ATAPI Command Set, published Sep. 16, 2008). For example, host logic (i.e., host controller 106, PCH 110, host controller interface 112), may issue commands such as IDENTIFY DEVICE, a command defined by the ATA/ATAPI command set, used by host logic to retrieve a peripheral device's identification data containing information regarding optional feature or command support provided by the device. Said host logic may also execute a Pre-Boot Authentication (PBA) program used for authenticating a use of the host system and unlocking a peripheral device.

The following power states may also be executed by SATA device 120 and the host platform (i.e., the device including processor 102, memory 104, etc.):

D0[1]—a peripheral device power state indicating that the device is on and running; for this power state, the peripheral device receives full power from the host platform and is delivering full functionality to the user.

D0active—a peripheral device power state indicating that the device has been configured/enabled by software and is functional.

D3hot—a peripheral device power state that occurs when a device transitions to D3, but still has Vcc applied.

D3cold—a peripheral device power state that occurs when a device transitions to D3 and Vcc is not applied.

Runtime D3 (RTD3)—a peripheral device power state indicating the placement of the device into D3hot/cold while the rest of the host platform remains in a S0 state.

S0—host platform power state; while the system is in the S0 state, it is in the system working state. Peripheral device states are individually managed by the operating system software and can be in any device state (D0 or D3).

S3—host platform low power state (also referred to as system sleeping state); system processors are not executing instructions and power is usually removed from the peripheral devices, but system Dynamic Random Access Memory (DRAM) context is maintained.

S4—host platform low power state (also referred to as hibernation); while the host platform is in S4, the processors are not executing instructions and power is usually removed from the peripheral devices, and system DRAM context is not maintained. System Basic Input/Output System (BIOS) may need to initialize the system on a transition to S0 (i.e. Power-On Self-Test (POST)). System context is maintained via non-volatile memory (e.g. storage device).

S5—host platform low power state (also referred to as soft-off); similar to S4 except that system context is not maintained via non-volatile memory.

In addition to the above described power states, embodiments of the invention may utilize the Device Sleep (DevSleep) power state. This state allows for mobile computing devices to consume less power and provide extended battery life by enabling SATA-based storage solutions to reach another level of low power operation. With the utilization of DevSleep, host platforms and peripheral devices have a new power management option in which the host and device can completely power down their respective physical layers (PHYs) and other link-related circuitry. Devices might also choose to power down additional sub-systems while in DevSleep, enabling even further power savings; however, the exit latency, and overall transition energy to/from DevSleep, is much lower compared to RTD3.

Figure 2A:
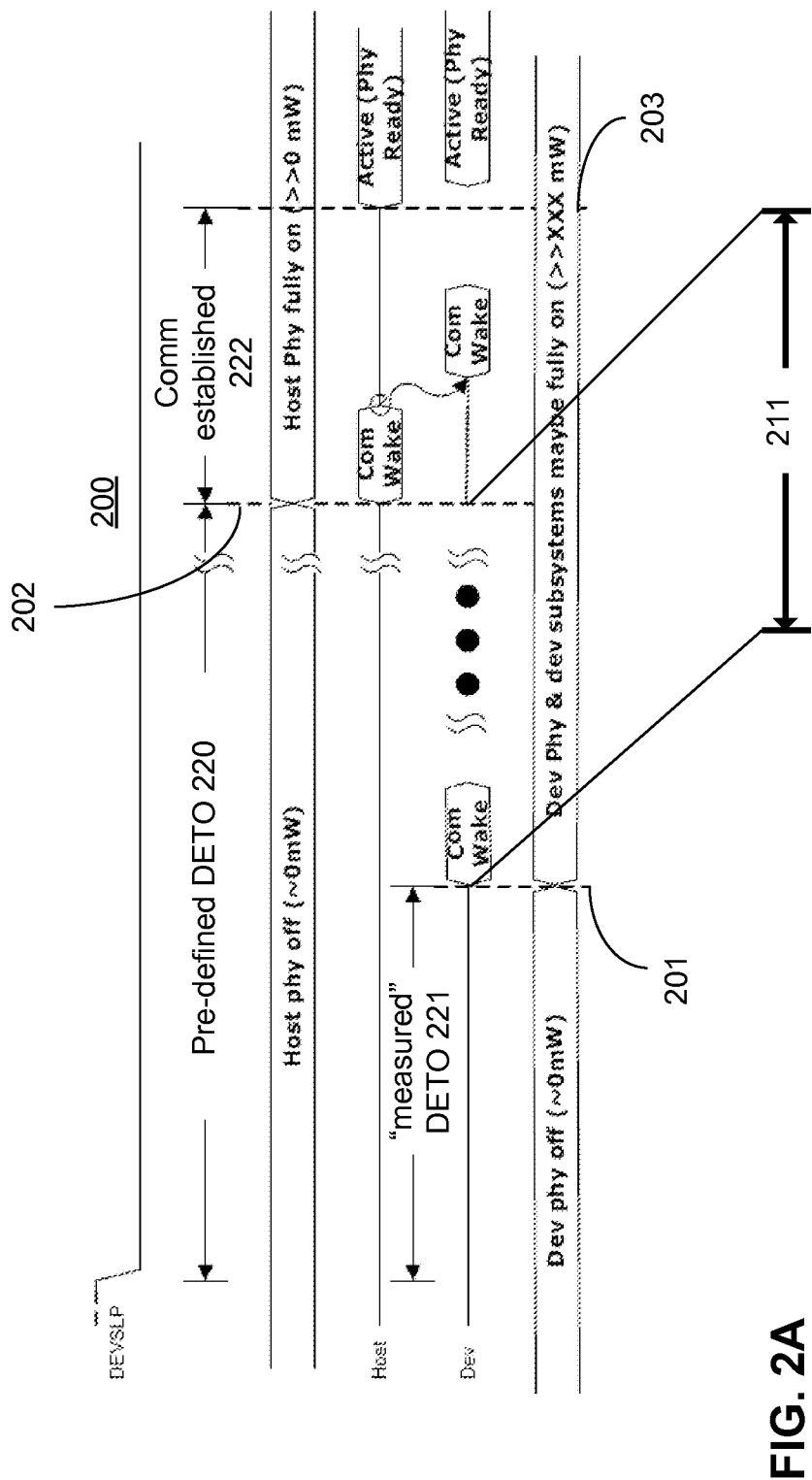
FIG. 2A-FIG. 2B are signal diagrams of host platform/peripheral device communication.
Figure 2B:
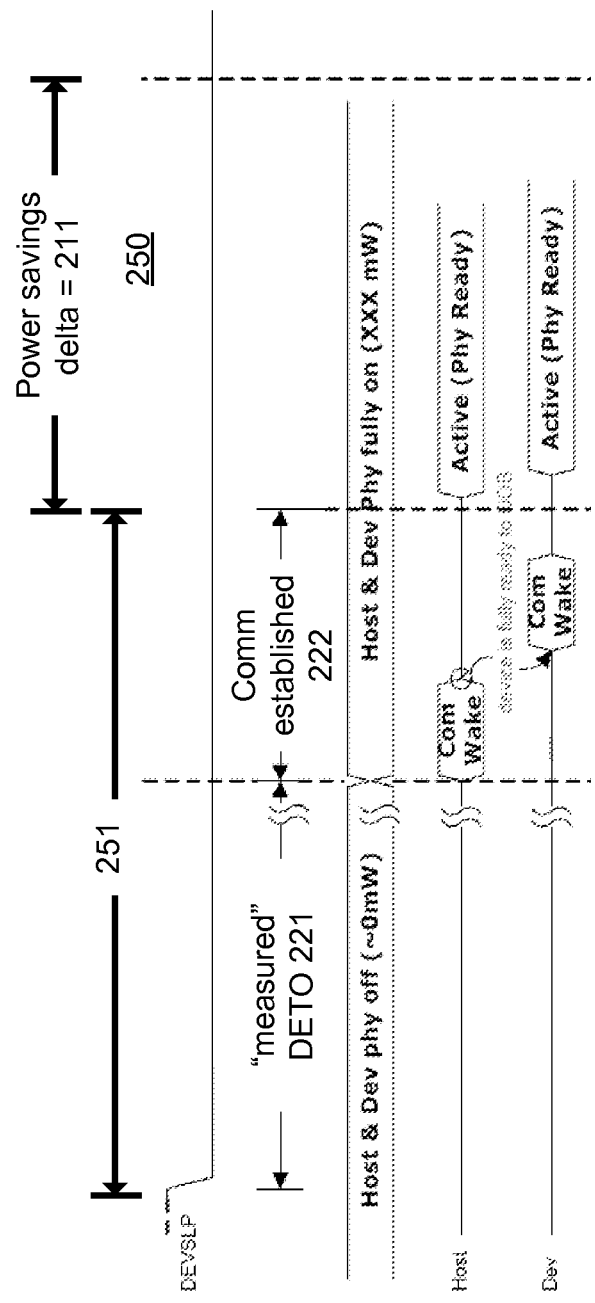

FIG. 2A-FIG. 2B are signal diagrams of host platform/peripheral device communication. Graph 200 of FIG. 2A illustrates initial host system and peripheral device communication when exiting a DevSleep state.

Signal DEVSLP as shown in graph 200 is transmitted from the host system to the peripheral device. When the host asserts the DEVSLP signal, the device enters the DevSleep interface power state for as long as the host asserts the DEVSLP signal. If operating consistent with a SATA standard, the host system may assert the DEVSLP signal from any power state (e.g., S0-S5, as discussed above) provided that: the peripheral device supports the DevSleep feature, the DevSleep feature is enabled by the host system, and there are no other outstanding commands between the host system and the peripheral device. Furthermore, in some embodiments the host system asserts the DEVSLP signal for at least 10 ms (or as specified in the IDENTIFY Device data), the host system and peripheral device may power down their respective PHY layers and other logic/circuitry (e.g., PLLs, clocks, media), no PHY communications are initiated, and all PHY communications between the host system and peripheral device are ignored. The DevSleep feature as defined by SATA specifications allows implementers flexibility regarding what the device actually does when the DEVSLP signal is asserted. The device may completely power down its PHY, and it may also choose to power down other subsystems, as long as it can meet the exit latency conditions.

When the host system negates the DEVSLP signal, the peripheral device returns from the DevSleep state. Graph 200 shows the host system and peripheral device using COM-WAKE signals for renegotiation; other embodiments may use equivalent signals such as COMRESET, COMINIT, etc. The signals used for negotiation/renegotiation processes utilize signals that are different than those used in ordinary communications. These signals are usually used during link initializations, and referred to as out of band (OOB) signals.

Graph 200 shows how, initially, a peripheral device may transition from a low power state into fully on state earlier than the host system. SATA specifications define a SATA device's DEVSLP exit timing parameter (herein referred to as 'DETO'). This pre-defined timing parameter is shown is pre-defined DETO 220, which is shown to be a time value from the de-assertion of DEVSLP to time mark 202. In this example, measured DETO value 221 is shown to be a time value from the de-assertion of DEVSLP to time mark 201, which is a smaller time value that pre-defined DETO 220. Thus, the peripheral device is unnecessarily transmitting COMWAKE signals to the host device for given time period (shown as time period 211, before communication is established during time period 222). The host and peripheral device layers are shown to be active at around time mark 203.

Embodiments of the invention optimize the exit sequence of the low power feature DEVSLP for the host system and peripheral device by aligning both parties' OOB communication at the same time. This enables communication to be reestablished in the quickest manner possible while keeping the host system and the peripheral device in lowest power state for longest possible duration.

Without this optimization, a SATA device maybe brought out of lowest power state into fully on state for tens to hundreds of milliseconds earlier than SATA host. This is because the SATA specification defines the SATA device's DEVSLP exit timing parameter DETO to be a maximum duration instead of a typical duration. The more a measured DETO time duration differs from its typical predefined value, the greater the benefit produced by embodiments of the invention in terms of overall system power.

FIG. 2B includes graph 250 showing host system and peripheral device communication when exiting a DevSleep state using a measured DETO. Similar to graph 200 of FIG. 2A, graph 250 shows signal DEVSLP being de-asserted, and the host system and peripheral device utilizing OOB signals (i.e., COMWAKE in this graph) for renegotiation processes.

As shown in this graph, in embodiments of the invention the peripheral device transitions from a low power state into fully on state using measured DETO 221, thus transitioning from DEVSLP at the same time (or closer to) as the host system. Thus, the peripheral device is no longer unnecessarily transmitting COMWAKE signals to the host device for given time period (in this example, time period 251, which includes measured DETO 221 and communication establishment time 222), resulting in a power savings equal to time period 211 (i.e., the period of unnecessary COMWAKE transmissions as shown in graph 200 of FIG. 2A).

While the example embodiments discussed above with respect to graphs 200 and 250 involve operations executed via the host platform controller, in other embodiments, said operations are executed via a SATA device controller (e.g., SSD controller 152 of FIG. 1B).

Figure 3:
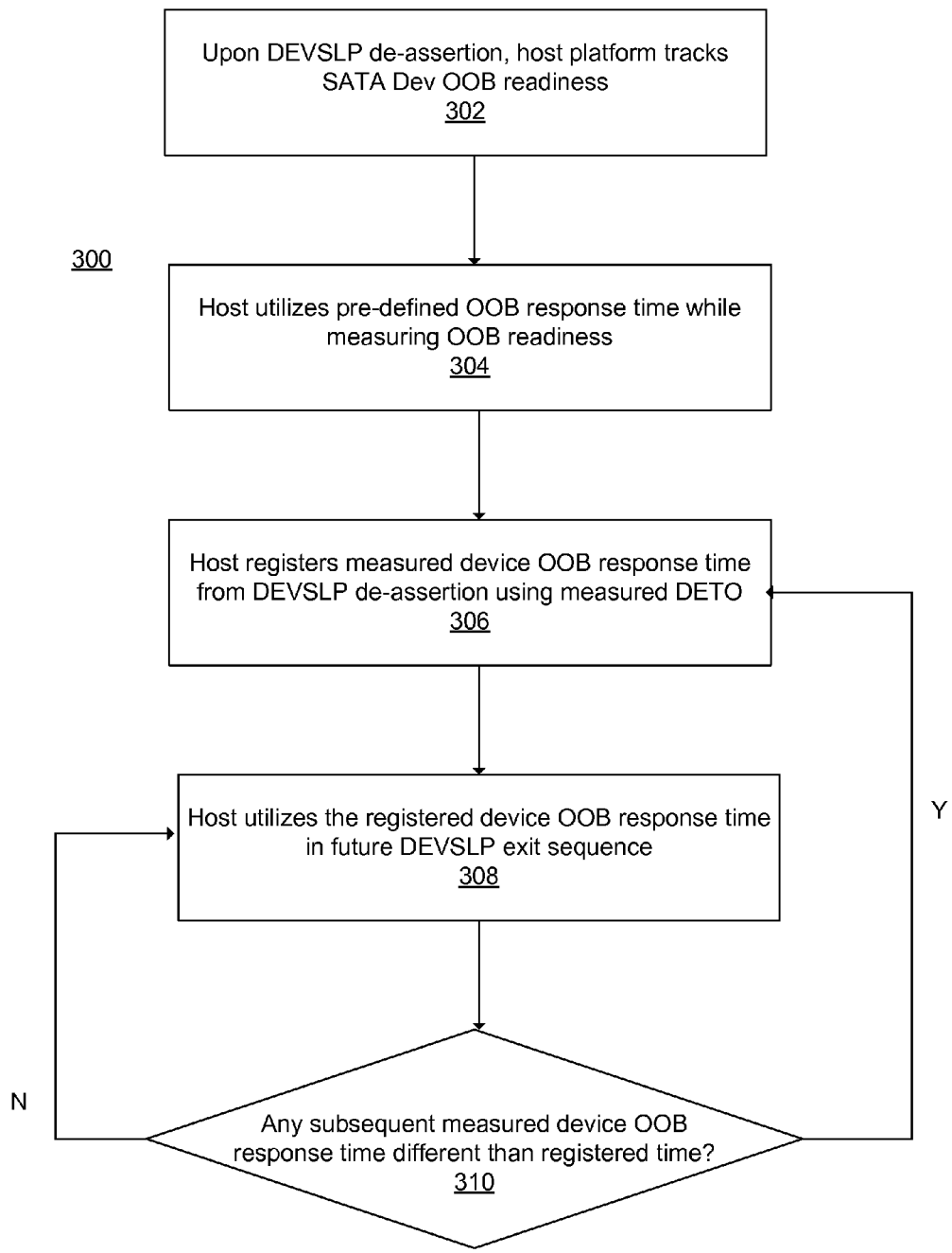
FIG. 3 is a flow diagram of a process for efficient low power state management according an embodiment of the invention.

FIG. 3 is a flow diagram of a process for efficient low power state management according an embodiment of the invention. Flow diagrams as illustrated herein provide examples of sequences of various process actions. Although shown in a particular sequence or order, unless otherwise specified, the order of the actions can be modified. Thus, the illustrated implementations should be understood only as examples, and the illustrated processes can be performed in a different order, and some actions may be performed in parallel. Additionally, one or more actions can be omitted in various embodiments of the invention; thus, not all actions are required in every implementation. Other process flows are possible.

Process 300 includes operations for, upon a host-platform controller de-asserting the DEVSLP signal, tracking a peripheral device's OOB readiness, 302. In some embodiments, this readiness is determined by the host platform transmitting an OOB message to the peripheral device and listening for a response. In this embodiment, this initial measurement of the peripheral device's OOB readiness is done while utilizing the pre-defined OOB response time, 304. An example of such an initial measurement is shown in graph 200 of FIG. 2A.

The host platform registers a time value based on the measured device OOB response time from DEVSLP de-assertion as the measured DETO time, 306. This registered time value is used in subsequent DEVSLP exit sequences, 308.

In some embodiments of the invention, the registered time value is updated based on subsequent measured DETO times, 310. For example, the host platform may register the lowest of the measured time values (i.e., replace the time value stored if the measured time value is lower), may store an average of measured time values (i.e., a weighted or un-weighted average), select a median measured time value, etc.

While the example process of FIG. 3 is discussed as being executed via the host platform controller, in other embodiments, process 300 is executed via a SATA device controller (e.g., SSD controller 152 of FIG. 1B).

Figure 4:
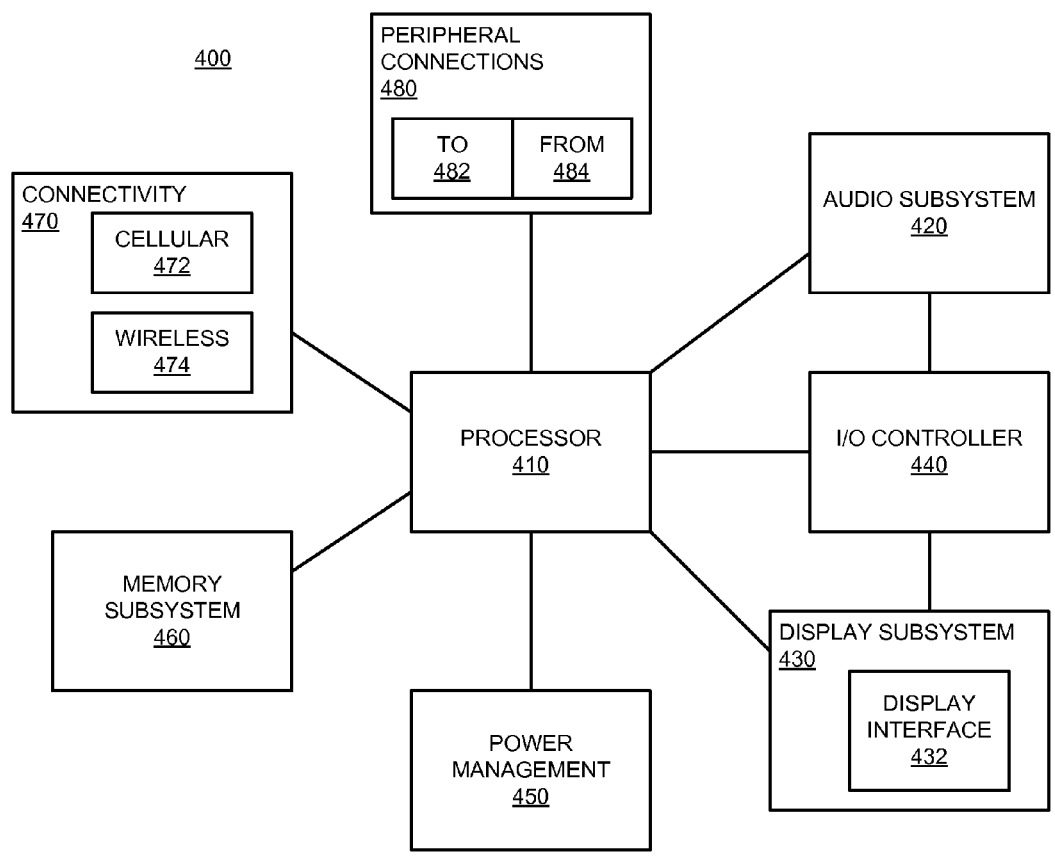
FIG. 4 is block diagram of a device incorporating an embodiment of the invention.

FIG. 4 is block diagram of a device incorporating an embodiment of the invention. Computing device 400 represents a mobile computing device, such as a notebook, sub-notebook, computing tablet, a mobile phone or smartphone, a wireless-enabled e-reader, or other wireless mobile device. It will be understood that certain of the components are shown generally, and not all components of such a device are shown in device 400.

Device 400 includes processor 410, which performs the primary processing operations of device 400. Processor 410 can include one or more physical devices, such as microprocessors, application processors, microcontrollers, programmable logic devices, processor cores, or other processing means. The processing operations performed by processor 410 include the execution of an operating platform or operating system on which applications and/or device functions are executed. The processing operations include operations related to I/O (input/output) with a human user or with other devices, operations related to power management, and/or operations related to connecting device 400 to another device. The processing operations may also include operations related to audio I/O and/or display I/O.

In one embodiment, device 400 includes audio subsystem 420, which represents hardware (e.g., audio hardware and audio circuits) and software (e.g., drivers, codecs) components associated with providing audio functions to the computing device. Audio functions can include speaker and/or headphone output, as well as microphone input via any of the audio jacks described above. Devices for such functions can be integrated into device 400, or connected to device 400. In one embodiment, a user interacts with device 400 by providing audio commands that are received and processed by processor 410.

Display subsystem 430 represents hardware (e.g., display devices) and software (e.g., drivers) components that provide a visual and/or tactile display for a user to interact with the computing device. Display subsystem 430 includes display interface 432, which includes the particular screen or hardware device used to provide a display to a user. In one embodiment, display interface 432 includes logic separate from processor 410 to perform at least some processing related to the display. In one embodiment, display subsystem 430 includes a touchscreen device that provides both output and input to a user.

I/O controller 440 represents hardware devices and software components related to interaction with a user. I/O controller 440 can operate to manage hardware that is part of audio subsystem 420 and/or display subsystem 430. Additionally, I/O controller 440 illustrates a connection point for additional devices that connect to device 400 through which a user might interact with the system. For example, devices that can be attached to device 400 might include microphone devices, speaker or stereo systems, video systems or other display device, keyboard or keypad devices, or other I/O devices for use with specific applications such as card readers or other devices.

As mentioned above, I/O controller 440 can interact with audio subsystem 420 and/or display subsystem 430. For example, input through a microphone or other audio device can provide input or commands for one or more applications or functions of device 400. Additionally, audio output can be provided instead of or in addition to display output. In another example, if display subsystem includes a touchscreen, the display device also acts as an input device, which can be at least partially managed by I/O controller 440. There can also be additional buttons or switches on device 400 to provide I/O functions managed by I/O controller 440.

In one embodiment, I/O controller 440 manages devices such as accelerometers, cameras, light sensors or other environmental sensors, or other hardware that can be included in device 400. The input can be part of direct user interaction, as well as providing environmental input to the system to influence its operations (such as filtering for noise, adjusting displays for brightness detection, applying a flash for a camera, or other features). In one embodiment, device 400 includes power management 450 that manages battery power usage, charging of the battery, and features related to power saving operation.

Memory subsystem 460 includes memory devices for storing information in device 400. Memory can include nonvolatile (state does not change if power to the memory device is interrupted) and/or volatile (state is indeterminate if power to the memory device is interrupted) memory devices. Memory 460 can store application data, user data, music, photos, documents, or other data, as well as system data (whether long-term or temporary) related to the execution of the applications and functions of system 400.

Connectivity 470 includes hardware devices (e.g., wireless and/or wired connectors and communication hardware) and software components (e.g., drivers, protocol stacks) to enable device 400 to communicate with external devices. The device could be separate devices, such as other computing devices, wireless access points or base stations, as well as peripherals such as headsets, printers, or other devices.

Connectivity 470 can include multiple different types of connectivity. To generalize, device 400 is illustrated with cellular connectivity 472 and wireless connectivity 474. Cellular connectivity 472 refers generally to cellular network connectivity provided by wireless carriers, such as provided via GSM (global system for mobile communications) or variations or derivatives, CDMA (code division multiple access) or variations or derivatives, TDM (time division multiplexing) or variations or derivatives, or other cellular service standards. Wireless connectivity 474 refers to wireless connectivity that is not cellular, and can include personal area networks (such as Bluetooth), local area networks (such as Wi-Fi), and/or wide area networks (such as Wi-Max), or other wireless communication.

Peripheral connections 480 include hardware interfaces and connectors for implementing low power control logic as described above, as well as software components (e.g., drivers, protocol stacks) to make peripheral connections, such as SATA devices as described above. It will be understood that device 400 could both be a peripheral device ("to" 482) to other computing devices, as well as have peripheral devices ("from" 484) connected to it. Device 400 commonly has a "docking" connector to connect to other computing devices for purposes such as managing (e.g., downloading and/or uploading, changing, synchronizing) content on device 400. Additionally, a docking connector can allow device 400 to connect to certain peripherals that allow device 400 to control content output, for example, to audiovisual or other systems.

In addition to a proprietary docking connector or other proprietary connection hardware, device 400 can make peripheral connections 480 via common or standards-based connectors. Common types can include a Universal Serial Bus (USB) connector (which can include any of a number of different hardware interfaces), DisplayPort including MiniDisplayPort (MDP), High Definition Multimedia Interface (HDMI), Firewire, or other type.

Thus, embodiments of the invention describe an apparatus or system comprising a memory, a host processor to execute an operating system (OS) stored in the memory, an antenna, radio frequency circuitry coupled to the antenna to receive signal data to be processed by the system, and a platform controller hub (PCH) including a host controller interface (HCI). Said HCI is configured to transmit a signal to a Serial Advanced Technology Attachment (SATA) peripheral device, communicatively coupled to the host controller, for exiting a low-power state, track an initialization time for out-of-band (OOB) transmission and reception logic of the SATA peripheral device, store a reference time value based on the tracked initialization time for the OOB transmission and reception logic for the SATA peripheral device, and utilize the reference time value for waking a host physical layer for exiting a low-power state.

In some embodiments, said HCI is configured to transmit an OOB signal to the SATA peripheral device, wherein the tracked initialization time for the OOB transmission and reception logic of the SATA peripheral device comprises a time from the transmission of the OOB signal to receiving an OOB response from the SATA peripheral device. The reference time value may comprise, for example, a lowest value of a plurality of tracked initialization times for the OOB transmission and reception logic of the SATA peripheral device, an average value of a plurality of tracked initialization times for the OOB transmission and reception logic of the SATA peripheral device, etc.

In some embodiments, said SATA peripheral device may comprise a hard disk storage device, a solid-state drive (SSD) storage device, or a hybrid hard disk/SSD device.

Various components referred to above as processes, servers, or tools described herein may be a means for performing the functions described. Each component described herein includes software or hardware, or a combination of these. Each and all components may be implemented as software modules, hardware modules, special-purpose hardware (e.g., application specific hardware, ASICs, DSPs, etc.), embedded controllers, hardwired circuitry, hardware logic, etc. Software content (e.g., data, instructions, configuration) may be provided via an article of manufacture including a non-transitory, tangible computer or machine readable storage medium, which provides content that represents instructions that can be executed. The content may result in a computer performing various functions/operations described herein.

A computer readable non-transitory storage medium includes any mechanism that provides (i.e., stores and/or transmits) information in a form accessible by a computer (e.g., computing device, electronic system, etc.), such as recordable/non-recordable media (e.g., read only memory (ROM), random access memory (RAM), magnetic disk storage media, optical storage media, flash memory devices, etc.). The content may be directly executable ("object" or "executable" form), source code, or difference code ("delta" or "patch" code). A computer readable non-transitory storage medium may also include a storage or database from which content can be downloaded. Said computer readable medium may also include a device or product having content stored thereon at a time of sale or delivery. Thus, delivering a device with stored content, or offering content for download over a communication medium may be understood as providing an article of manufacture with such content described herein.

The invention claimed is:

1. A system comprising:
   a memory;
   a host processor to execute an operating system (OS) stored in the memory;
   a host controller interface to:
      transmit a signal to a Serial Advanced Technology Attachment (SATA) peripheral device, communicatively coupled to the host controller, to exit a low-power state;
      track an initialization time for out-of-band (OOB) transmission and reception logic of the SATA peripheral device;
      store a reference time value based on the tracked initialization time for the OOB transmission and reception logic for the SATA peripheral device; and
      utilize the reference time value to wake a host physical layer to exit a low-power state;
   an antenna; and
   radio frequency circuitry coupled to the antenna to receive signal data to be processed by the system.

2. The system of claim 1, the host controller interface to further:
   transmit an OOB signal to the SATA peripheral device,
   wherein the tracked initialization time for the OOB transmission and reception logic of the SATA peripheral device comprises a time from the transmission of the OOB signal to receive an OOB response from the SATA peripheral device.

3. The system of claim 2, wherein the reference time value comprises a lowest value of a plurality of tracked initialization times for the OOB transmission and reception logic of the SATA peripheral device.

4. The system of claim 2, wherein the reference time value comprises an average value of a plurality of tracked initialization times for the OOB transmission and reception logic of the SATA peripheral device.

5. The system of claim 1, wherein the SATA peripheral device comprises a hard disk storage device.

6. The system of claim 1, wherein the SATA peripheral device comprises a solid-state drive (SSD) storage device.

7. The system of claim 1, wherein the SATA peripheral device comprises a hybrid hard disk/SSD device.

8. An apparatus comprising:
   a host controller interface to:
      transmit a signal to a Serial Advanced Technology Attachment (SATA) peripheral device, communicatively coupled to the host controller interface, to exit a low-power state;
      track an initialization time for out-of-band (OOB) transmission and reception logic of the SATA peripheral device;
      store a reference time value based on the tracked initialization time for the OOB transmission and reception logic for the SATA peripheral device; and
      utilize the reference time value to wake a host physical layer to exit a low-power state; and
   a root port to couple to one or more Peripheral Component Interconnect express (PCIe) devices.

9. The apparatus of claim 8, the host controller interface to further:
   transmit an OOB signal to the SATA peripheral device,
   wherein the tracked initialization time for the OOB transmission and reception logic of the SATA peripheral device comprises a time from the transmission of the OOB signal to receive an OOB response from the SATA peripheral device.

10. The apparatus of claim 9, wherein the reference time value comprises a lowest value of a plurality of tracked initialization times for the OOB transmission and reception logic of the SATA peripheral device.

11. The apparatus of claim 9, wherein the reference time value comprises an average value of a plurality of tracked initialization times for the OOB transmission and reception logic of the SATA peripheral device.

12. The apparatus of claim 8, wherein the SATA peripheral device comprises a hard disk storage device.

13. The apparatus of claim 8, wherein the SATA peripheral device comprises a solid-state drive (SSD) storage device.

14. A method comprising:
   transmitting a signal from a host device to a Serial Advanced Technology Attachment (SATA) peripheral device to exit a low-power state;
   tracking an initialization time for out-of-band (OOB) transmission and reception logic of the SATA peripheral device;
   storing a reference time value based on the tracked initialization time for the OOB transmission and reception logic for the SATA peripheral device; and
   utilizing the reference time value to wake a host physical layer to exit a low-power state.

15. The method of claim 14, further comprising:
   transmitting an OOB signal from the host device to the SATA peripheral device,
   wherein the tracked initialization time for the OOB transmission and reception logic of the SATA peripheral device comprises a time from the transmission of the OOB signal to receive an OOB response at the host device from the SATA peripheral device.

16. The method of claim 15, wherein the reference time value comprises a lowest value of a plurality of tracked initialization times for the OOB transmission and reception logic of the SATA peripheral device.

17. The method of claim 15, wherein the reference time value comprises an average value of a plurality of tracked initialization times for the OOB transmission and reception logic of the SATA peripheral device.

18. The method of claim 14, wherein the SATA peripheral device comprises a hard disk storage device.

19. The method of claim 14, wherein the SATA peripheral device comprises a solid-state drive (SSD) storage device.

20. The method of claim 14, wherein the SATA peripheral device comprises an optical storage device.

* * * * *